US011372690B2

(12) United States Patent
Feldman et al.

(10) Patent No.: US 11,372,690 B2
(45) Date of Patent: Jun. 28, 2022

(54) MULTI-PHASE DISTRIBUTED TASK COORDINATION

(71) Applicant: Microsoft Technology Licensing, LLC, Redmond, WA (US)

(72) Inventors: Michael Feldman, Pardesiya (IL); Nimrod Ben Simhon, Netanya (IL); Ayelet Kroskin, Raanana (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 377 days.

(21) Appl. No.: 16/592,612

(22) Filed: Oct. 3, 2019

(65) Prior Publication Data

US 2021/0103482 A1 Apr. 8, 2021

(51) Int. Cl.
| | |
|---|---|
| *G06F 9/52* | (2006.01) |
| *G06F 9/48* | (2006.01) |
| *G06F 9/50* | (2006.01) |
| *H04L 67/10* | (2022.01) |
| *H04L 12/28* | (2006.01) |
| *G06F 7/58* | (2006.01) |
| *G06F 11/00* | (2006.01) |

(52) U.S. Cl.
CPC ............... *G06F 9/52* (2013.01); *G06F 7/582* (2013.01); *G06F 9/4881* (2013.01); *G06F 9/5083* (2013.01); *H04L 67/10* (2013.01); *G06F 11/008* (2013.01); *H04L 12/2896* (2013.01)

(58) Field of Classification Search
None
See application file for complete search history.

(56) References Cited

U.S. PATENT DOCUMENTS

| | | |
|---|---|---|
| 5,161,227 A | 11/1992 | Dias et al. |
| 8,370,318 B2 | 2/2013 | Chan et al. |
| 8,868,748 B2 | 10/2014 | Attaluri et al. |
| 8,949,566 B2 | 2/2015 | Kandasamy et al. |
| 10,148,754 B1 | 12/2018 | Eggleston et al. |

(Continued)

FOREIGN PATENT DOCUMENTS

EP 3158446 A1 4/2017

OTHER PUBLICATIONS

Atreya, et al., "A Quorum-Based Group Mutual Exclusion Algorithm for a Distributed System with Dynamic Group Set", In Journal of IEEE Transactions on Parallel and Distributed Systems, vol. 18, Issue 10, Sep. 17, 2007, pp. 1-31.

(Continued)

*Primary Examiner* — Qing Yuan Wu

(57) ABSTRACT

The disclosed distributed task coordination ensures task execution while minimizing both the risk of duplicate execution and resources consumed for coordination. Execution is guaranteed, while only best efforts are used to avoid duplication. Example solutions include requesting, by a node, a first lease from a first set of nodes; based at least on obtaining at least one first lease, requesting, by the node, a second lease from a second set of nodes; based at least on the node obtaining at least one second lease, determining a majority holder of second leases; and based at least on obtaining the majority of second leases, executing, by the node, a task associated with the at least one second lease. In some examples, the nodes comprise online processing units (NPUs). In some examples, if a first node begins executing the task and fails, another node automatically takes over to ensure completion.

20 Claims, 8 Drawing Sheets

(56) References Cited

U.S. PATENT DOCUMENTS

2002/0112008 A1    8/2002   Christenson et al.
2018/0373750 A1   12/2018   Zhu et al.

OTHER PUBLICATIONS

Burrows, Mike, "The Chubby Lock Service for Loosely-Coupled Distributed Systems", In Proceedings of the 7th Symposium on Operating Systems Design and Implementation, Nov. 6, 2006, pp. 335-350.

Hupfeld, et al., "FaTLease: Scalable Fault-Tolerant Lease Negotiation with Paxos", In Journal of Cluster Computing, Jan. 29, 2009, pp. 175-188.

"International Search Report and Written Opinion Issued in PCT Application No. PCT/US20/045305", dated Oct. 23, 2020, 15 Pages.

US 11,372,690 B2

MULTI-PHASE DISTRIBUTED TASK COORDINATION

BACKGROUND

When large clusters of computing nodes operate in a distributed manner to perform a set of tasks, a coordination scheme is needed to ensure that the tasks are performed, while avoiding wasteful duplication of effort. That is, distributed arrangements occasionally need to perform at least some synchronization between machines for mutual exclusion, to ensure that no two machines are executing the same task at the same time. There are various approaches used, including relying on a full consensus algorithm that allows for an "at-most-once" situation, which means that at most one node holds the lock for a given task, at a given time.

Unfortunately, such approaches have drawbacks: they can incur high latencies; implementation, debugging, and monitoring can be challenging; and because they are based on some form of quorum, availability can suffer. For example, if at some point, more than half of the nodes are down, no node can achieve a lock on a task, because the consensus mechanism will not converge.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to solutions for multi-phase distributed task coordination that include: requesting, by a first node, a first lease from a first set of nodes; based at least on obtaining at least one first lease, requesting, by the first node, a second lease from a second set of nodes; based at least on the first node obtaining at least one second lease, determining a majority holder of second leases; and based at least on obtaining the majority of second leases, executing, by the first node, a task associated with the at least one second lease. In some examples, a node is an instance (or virtual machine) on an online processing unit (NPU).

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
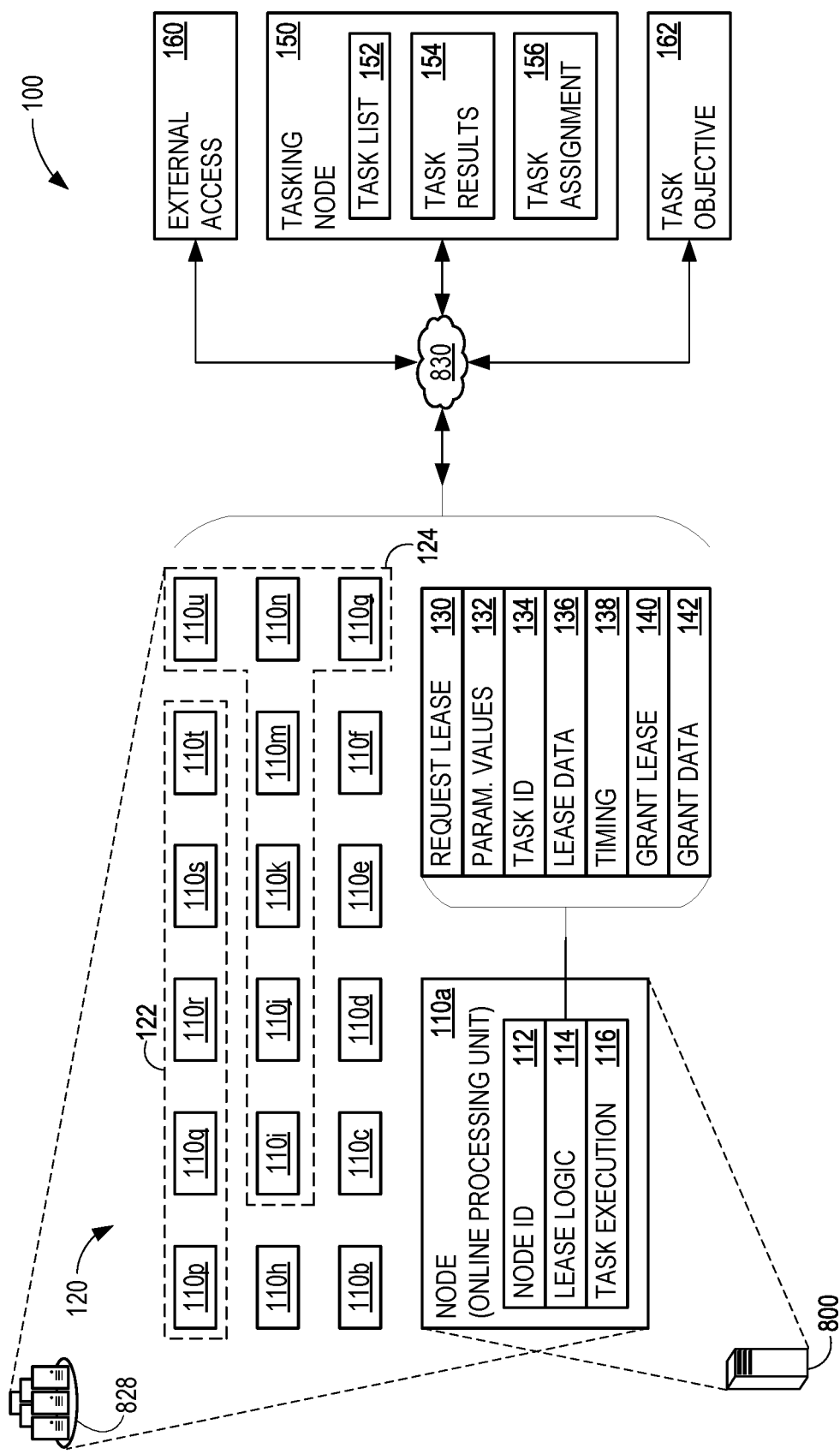
FIG. 1 illustrates an arrangement of nodes that can advantageously employ multi-phase distributed task coordination.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

An alternative to an "at-most-once" approach is an "at-least-once" approach, which is feasible when double-execution has minimal side-effects. Although such an alternative approach can reduce the scenarios in which a task is not performed for lack of consensus, is unfortunately risks the possibility that multiple nodes can simultaneously acquire locks for the same task. Existing approaches do not scale elegantly, and may still become stuck when a large number of nodes are down.

Therefore, the disclosed distributed task coordination ensures task execution, while minimizing both the risk of duplicate execution and resources consumed for coordination. Execution is guaranteed, while only best efforts are used to avoid duplication. Example solutions include requesting, by a node, a first lease from a first set of nodes; based at least on obtaining at least one first lease, requesting, by the node, a second lease from a second set of nodes; based at least on the node obtaining at least one second lease, determining a majority holder of second leases; and based at least on obtaining the majority of second leases, executing, by the node, a task associated with the at least one second lease. In some examples, the nodes comprise instances on online processing units (oNline Processing Units, NPUs). In some examples, if a first node begins executing the task and fails, another node automatically takes over to ensure completion.

Aspects of the disclosure describe a reliable best effort distributed lock that can be used for scheduling a myriad of different distributed task processing activities. The need for a master scheduling node is advantageously avoided. Aspects of the disclosure operate in an unconventional way by leveraging a multi-phase approach that is based on a sequence of leases (a time limited lock), with smart timing and exponential back-off. Multiple advantages become evident, including low probability that two nodes will hold the same lock at the same time, elegant scaling to a large number of nodes, high availability, low latency (operating near real time), and easier implementation, debugging, and monitoring.

The disclosed locking techniques ensure that locks are granted (preventing lockout), while largely preventing duplicate execution, when possible. When attempting to acquire a resource lock, nodes enter a multi-phase lockout process. One phase involves nodes broadcasting intent to acquire a first lock, followed by another phase where the nodes seek to obtain a majority consensus from other nodes that they are the lock holder. A contender selection phase and a following majority phase operate quickly, with minimized resource demands. The locks are implemented as time-limited leases that must be renewed, and because the leases have been granted to one node, the other nodes are denied leases. It is this denial of leases, coupled with the need for obtaining a majority of second leases, that acts as an execution lock for a task. A node that acquires a lease, but fails to renew prior to a timeout, loses the lease (which may then be reassigned to another node), thereby preventing a deadlock condition.

In some examples, when an NPU is ready to be executed, its instances attempt to acquire leases to determine which instance will execute the job (task). The lease acquisition process ensures that with high probability, only one instance will obtain the required leases, allowing it to execute. It is possible that from time to time, more than one instance will obtain the required leases, leading to more than one instance running the NPU concurrently. In some examples, every instance that obtains the required leases will execute the NPU's job. If more than one instance receives the required leases, then each such instance will generate an output. Deconfliction among multiple outputs for the same task may be accomplished using version management techniques.

FIG. 1 illustrates an arrangement 100 of nodes 110a-110u that can advantageously employ multi-phase distributed task coordination. Nodes 110a-110u forms a set of nodes 120 that provides for distributed operation in the performance of tasks of the type that may be associated with large computational clusters. Nodes 110a-110u are coupled to enable communications in support of distributed computational operations. In some examples, a node is an instance on an NPU. As illustrated, node 110a executes on a computing device 800, and a set of nodes 120, comprising individual nodes 110a-110u, is available to users as a cloud resource 828. It should be understood that a different number, arrangement, and configuration processing capability may be used. Computing devices 800 and cloud resource 828 are described in further detail in relation to FIG. 8.

Detail shown for node 110a may be replicated for other nodes 110b-110u, as needed, in order to perform the activities disclosed herein. Node 110a is illustrated as having a NPU ID 112, which may be an alphanumeric designation unique to node 110a and permits addressing and unique identification of node 110a relative to other nodes 110b-110u. A lease logic component 114 performs the multi-phase distributed task coordination activities that operate within 110a, and a task execution component 116 performs the payload processing of node 110a that, along with equivalent functionality on other nodes 110b-110u, provides the value of set of nodes 120 to users.

Lease logic component 114 has multiple logic and data components, such as a request lease logic component 130; parameter values 132, which may include one or more random numbers, timeout values, and counters; a task ID 134; lease data 136; a timing component 138; a grant lease logic component 140; and grant data 142. Together, request lease logic component 130; parameter values 132, task ID 134, lease data 136, and timing component 138 enable node 110a to obtain a lock on a particular task, identified by task ID 134. For example, request lease logic component 130 uses parameter values 132 to perform at least a portion of the operations described in relation to FIGS. 3 and 4 to obtain leases, identified in lease data 136, and retained using timing component 138 to ensure timely lease renewals.

Because set of nodes 120 operates in a peer-to-peer manner, some nodes operate to grant leases to other nodes. In some examples, the same class of nodes (e.g., instances of an NPU that execute tasks) also grant leases. In some examples, the set of nodes that grant leases is a different class of node, such as an instance or process that does not execute the tasks for which coordination is being accomplished. In FIG. 1, a set of nodes 122, shown as including five nodes 110p-110t, grants (or denies, as the case may be) first leases for one of the phases of the multi-phase distributed task coordination. Thus, node 110a will request a first lease from each node within set of nodes 122. Additionally, a set of nodes 124, shown as including seven nodes 110g, 110a-110n, and 110u, grants (or denies, as the case may be) second leases for another one of the phases of the multi-phase distributed task coordination. Thus, node 110a, if it has obtained at least one first lease, will request a second lease from each node within set of nodes 124. In an algorithm disclosed below, following the description of FIG. 3, set of nodes 122 is identified as S1, a first lease is identified as an A token, set of nodes 124 is identified as S2, and a second lease is identified as a B token.

In some examples, when another node within set of nodes 120 is attempting to obtain a lock on another task, it is possible that node 110a will be part of a set of nodes that grants or denies leases to the other node for that other task. In support of those operations, which are described in further detail in relation to FIG. 5, node 110a uses grant lease logic component 140 and grant data 142. For example, node 110a uses grant lease logic component 140 to determine whether to grant, deny, or revoke a license, and holds the data necessary to support such determinations within grant data 142. In examples in which different classes of nodes execute the tasks versus grant licenses, grant lease logic component 140 and grant data 142 will not reside on node 110, but instead will reside on another node (e.g., node 110u).

In some examples, set of nodes 120 obtains tasks from a tasking node 150. Illustrated tasking node 150 has a task list 152 that includes task IDs (e.g., task ID 134), along with parameters and other data and logic necessary for a node to properly execute the tasks. Task results 154 holds the final results of competed tasks, for retrieval by users and/or other processes. In some examples, task results 154 also holds checkpoint data for partially-completed tasks, so that if a first node executing a task has partial results and then fails, another node that picks up the last may retrieve the checkpoint data and continue execution from that point. Some examples do not use checkpoint data, and if a first node fails, the second node will start from the beginning of the task. Task assignment data 156 stores information regarding which of nodes 110a-110u is performing a particular task. Operations of tasking node 150 are described in further detail in relation to FIG. 6.

External access 160 permits users (which may be human users or other computational resources) to access the computational power of set of nodes 120, generate tasks for task list 152, and retrieve task results 154. In some examples, a task involves one or more of nodes 110a-110u accessing external resources. For example, a task may be a web crawling operation for populating a search engine reference database, from which search results are mined. A task objective 162 represents external target resources that are accessed by set of nodes 120 in performance of various tasks. In some examples, however, nodes 110a-110u process primarily (or only) data that resides within set of nodes 120. As illustrated, tasking node 150, external access 160, and task objective 162 are accessed by set of nodes 120 across a network 830, although it should be understood that other configurations may be used.

Figure 8:
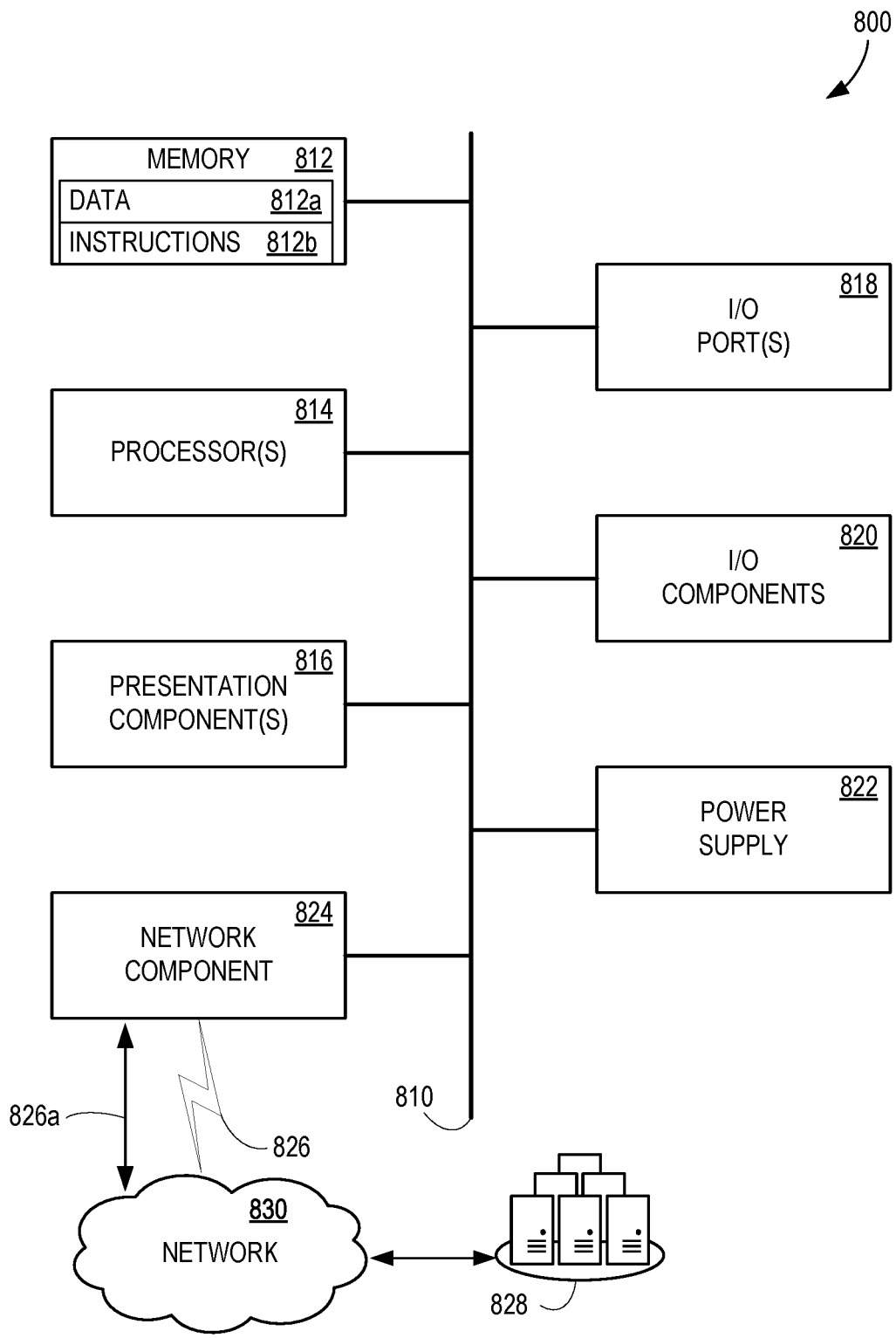
FIG. 8 is a block diagram of an example computing environment suitable for implementing some of the various examples disclosed herein.

In general, the various components of arrangement 100 may be implemented on a plurality of computing devices 800 and/or a cloud resource 828, which are described in further detail in relation to FIG. 8. Thus, at least some of the operations described herein for arrangement 100 may be implemented by a processor executing instructions that are stored on a computer-readable medium.

Figure 2:
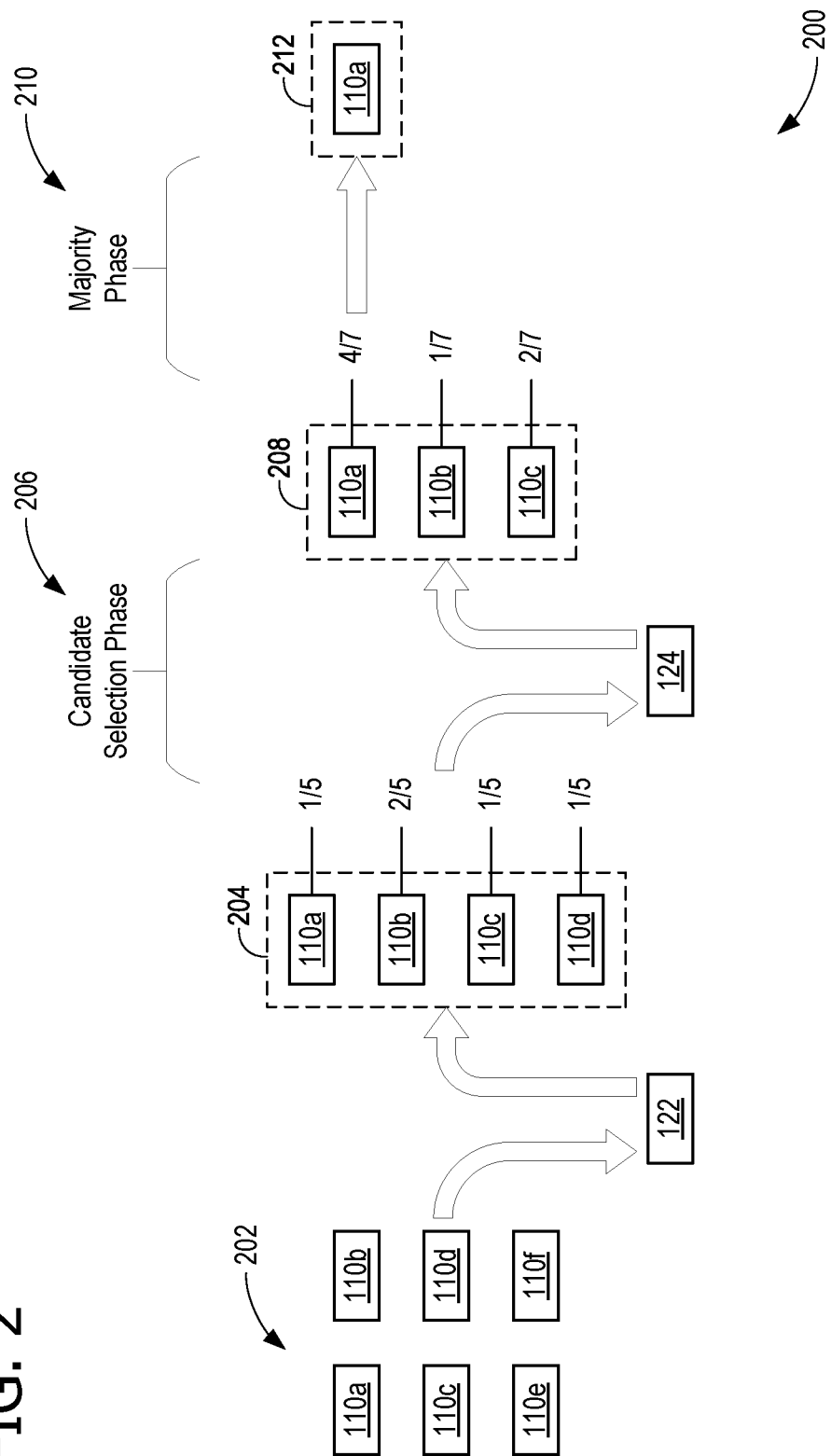
FIG. 2 shows an exemplary set of stages in multi-phase distributed task coordination, such as may be employed by the arrangement of FIG. 1.

FIG. 2 shows an exemplary set of stages 200 in multi-phase distributed task coordination, such as may be employed by arrangement 100. A first set of nodes 202 broadcasts their respective intent to acquire a first lock. In this manner, they request a first lease from set of nodes 122, which collectively grants first leases to set of nodes 204, as illustrated. Node 110a receives one of the five first leases; node 110b receives two of the five first leases; node 110c receives one of the five first leases; and node 110d receives one of the five first leases. Nodes 110a-110d are thus candidates. In a candidate selection phase 206, each of nodes 110a-110d requests a second lease from set of nodes 124, which collectively grants second leases to set of nodes 208, as illustrated. Node 110a receives four of the seven second leases; node 110b receives one of the seven second leases; and node 110c receives two of the seven second leases. In a majority phase 210, it is determined that node 110a is a majority holder 212, and thus the winner. Node 110a thus begins executing the task, while nodes 110b and 110c await either the second leases to become available again, such as by node 110a going down and failing to keep the second leases alive, or exhausting retry attempts.

Figure 3:
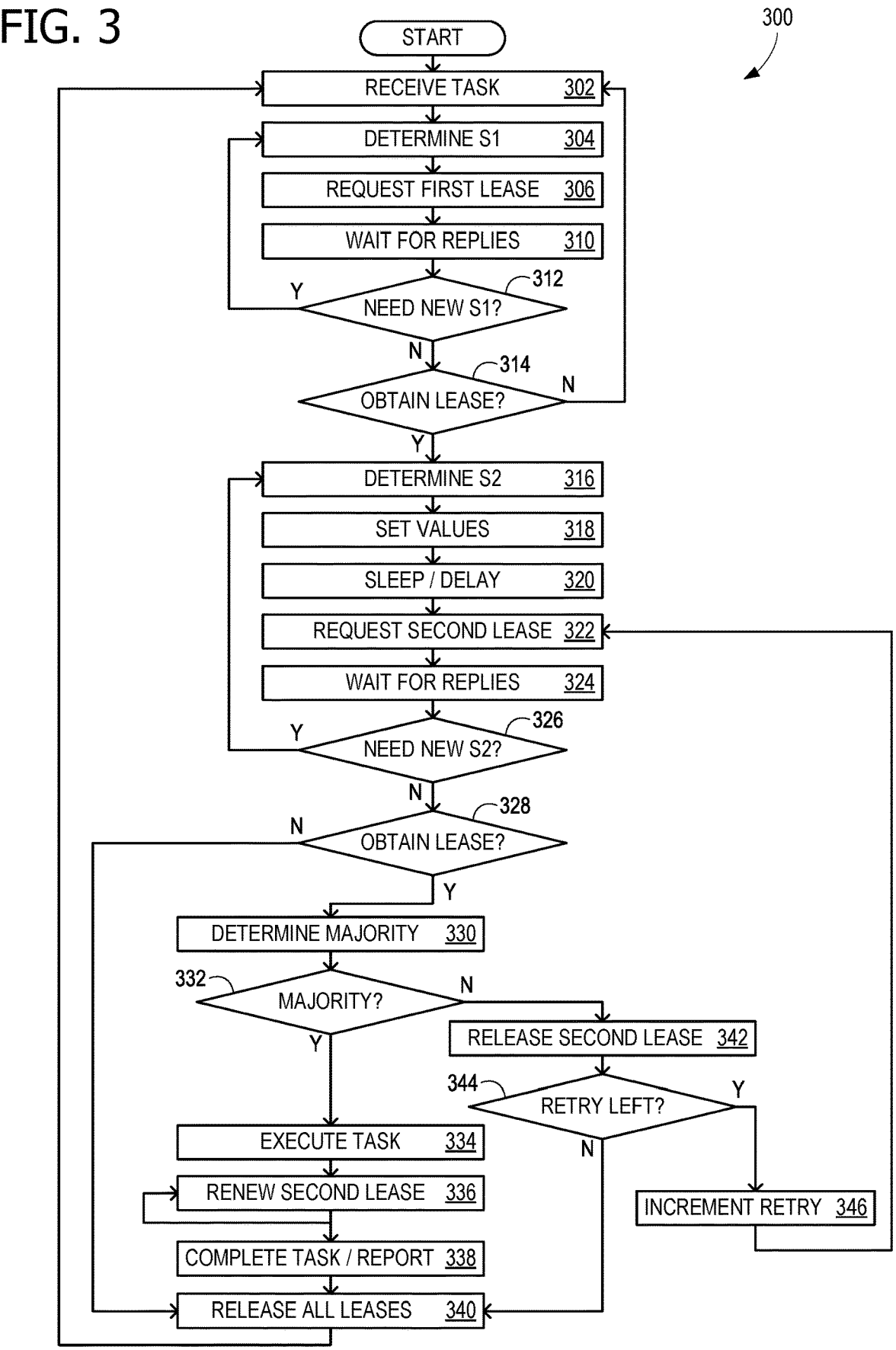
FIG. 3 is a flow chart illustrating exemplary operations involved in multi-phase distributed task coordination, such as may be performed by the arrangement of FIG. 1.

FIG. 3 is a flow chart 300 illustrating exemplary operations involved in multi-phase distributed task coordination, such as may be performed by arrangement 100 of FIG. 1. In some examples, operations described for flow chart 300 are performed by computing device 800 of FIG. 8. Flow chart 300 shows a process by which leases are obtained by a node in pursuit of an execution locks. An algorithm is provided following the description of flow chart 300, which implements an example of flow chart 300. Flow chart 300 commences with operation 302, which includes receiving a task. In some examples, this includes receiving, from a tasking node, an indication of a task to execute. In some examples, the node requests a task and receives identification of a task in response to the request. Operation 304 includes determining the first set of nodes, from which to request the first lease. In the algorithm that follows this description of FIG. 3, the first set of nodes is identified as S1, and the first lease is identified as an A token. In some examples, S1 is limited to five lease-granting nodes. In FIG. 1, the first set of nodes, S1, I identified as set of nodes 122.

Operation 306 includes requesting, by a first node, a first lease from the first set of nodes. Each of the nodes in S1 is contacted, so that it is possible that the first node will receive grants for more than one first lease. (See FIG. 2 for an example of this occurring.) However, operation 310 involves the first node waiting for a timeout period for replies from S1. In some scenarios, not all of the nodes in S1 respond in a timely manner. If a threshold number of S1 nodes fail to respond, decision operation 312 determines that a new S1 is required. Flow chart 300 then returns to operation 304. Otherwise, the node determines whether it has received any first leases (A tokens), in decision operation 314. If not, flow chart 300 returns to operation 302 to receive a new task.

If the first node has obtained at least one first lease, then operation 316 includes determining the second set of nodes, S2, from which to request the second lease (B token). In some examples, the second set of nodes has an odd number. In FIGS. 1 and 2, for example the second set of nodes, S2, is identified as set of nodes 124, which has seven members.

Some values are set in operation 318, such as one or more random numbers that are used as parameters. In some examples, operation 320 includes, after obtaining the at least one first lease, delaying prior to requesting the second lease. In some examples, the delay has a duration that is based at least on a random or pseudorandom number, such as a random number determined during operation 318. In some examples, the delay has a duration that is based at least on a node ID. In such examples, of the nodes that manage to acquire A token leases, the lower their node ID is, the less time they delay (or sleep). In some examples, the delay has a duration that is based at least on a retry number. In such examples, on each subsequent retry to obtain second leases, the longer the delay. In some examples, the retry delay increase exponentially. The sleep delay of operation 320 reduces the likelihood of multiple contenders attempting to acquire second leases (B tokens) at the same time.

Operation 322 includes, based at least on obtaining at least one first lease, requesting, by the first node, a second lease (B token) from the second set of nodes (S1). Operation 324 is a waiting period for the responses to time out. Decision operation 326 determines whether a new set of nodes is needed for granting the second lease, similarly to how decision operation 312 determining whether a new set of nodes was needed for granting the first least. If, according to decision operation 326, a new set of nodes is needed, flow chart 300 returns to operation 316. Otherwise, the node determines whether it has received any second leases (B tokens), in decision operation 328. If not, flow chart 300 advances to operation 340 to release all leases (both first and second leases, if any) and the returns to operation 302 to receive a new task.

If the first node has received at least one second lease, flow chart 300 moves to operation 330. Operation 330 includes, based at least on the first node obtaining at least one second lease, determining a majority holder of second leases. Any node can count the leases it has received. Further, because if a lease was denied, the lease-granting node identifies the node that had obtained the lease, any of the nodes requesting leases knows the score of all other nodes that have at least one lease. Thus, any node requesting second leases is able to identify the majority holder of second leases. Decision operation 332, however, is determined for each node itself, that has requested a second lease. That is rather than a node determining which node is the majority holder of second leases, decision operation 332 is effectively each node determining "Am I the majority holder of second leases?"

Although it is not guaranteed that any node is the majority holder of second leases (e.g., there may be a tie), if there is one (the first node, in this example), then operation 334 includes, based at least on obtaining the majority of second leases, executing, by the first node, a task associated with the at least one second lease. While the first node is continuing to execute the task, operation 336 includes, renewing, by the first node, the at least one second lease prior to a timeout. Renewing the leases, at least the second leases, is necessary to prevent a second node from also becoming a majority holder of second leases (that had been revoked and re-granted), while the first node is continuing to execute the task. Thus, operation 336 is ongoing, based on a timer event that is shorter than the timeout period for the second leases, until the first node completes the task. Upon completion, the node reports the results to the correct location (e.g., task results 154 of FIG. 1), in operation 338. In operation 340, the node releases all leases for the task. In some examples, the lease granting nodes cease granting leases for the task based at least on learning that the task has been completed. This is because, when flow chart 300 returns to operation 302, a new task will spawn new sets of lease-granting nodes for that new task, in operations 304 and 316.

Returning to the other branch of decision operation 332, in which the node determines that it is not the majority holder of second leases. Operation 342 includes, based at least on not obtaining the majority of second leases, releasing, by the first node, all second leases. Decision operation 344 determines whether the node has exceeded a maximum limit on retry attempts to obtain second leases. If no retries remain, flow chart moves to operation 340 to release all leases, which in this situation would be first leases, and then back to operation 302 to try with another task. If, however at least one retry remains, the operation 346 increments a retry counter, and flow chart 300 returns to operation 322 for the node to try again. In this pass, operation 322 includes, based at least on not exceeding a retry threshold, requesting again, by the first node, a second lease from the second set of nodes.

An algorithm is provided for implementing examples of at least a portion of flow chart 300. Further details regarding the algorithm are provided after.

Inputs
1. Node name;
2. A 64-bit random number (rand);
3. $\alpha_1$—the number of servers from which the A token is requested, and which defines the maximum number of contenders;
4. $\alpha_2$—An odd number, the number of servers from which the B token is requested, such that the majority is at least $(\alpha_2/2)+1$.
5. The number of available servers in the deployment.

$1^{st}$ Token Algorithm (the a Token or First Lease)
1. Compute S1, a set of $\alpha_1$ servers, based on the node name.
2. For each server in S1, issue an Acquire-A-Token call, passing rand and the node name as parallel calls.
3. Wait for all calls to return or timeout.
4. Act according to the following cases:
    a. If the number of results returned is less than $\alpha_1$
        i. If all servers were already visited, go to 4.b or 4.c.
        ii. Compute a new set S1 of servers and go to #2.
    b. If no A tokens were obtained, return false.
    c. If at least one A token was obtained, return true.

$2^{nd}$ Token Algorithm (the B Token or Second Lease)
1. Compute S2, a set of $\alpha_2$ servers, based on the node name.
2. Set retry-count=0.
3. Let R={rand}, the value used in the Acquire-A-Token call.
4. Sleep a time that is proportional to the current rand's position in R, current retry count, and a short random time.
5. For each server in S2, issue an Acquire-B-Token call, passing rand and the node name as parallel calls.
6. Wait for all calls to return or timeout
7. Act according to the following cases:
    a. If an insufficient number of results were returned to allow any node to obtain a majority:
        i. If all servers were already visited, return false, with an alert, and release all acquired leases.
        ii. Compute a new set S2 of servers and go to #5.
    b. If another server obtained the majority, free all acquired leases and return false.
    c. If no B tokens were obtained, release all acquired leases and return false.
    d. If a majority of the B tokens was obtained, return true and release all A tokens.
    e. If some B tokens, but less than a majority, were obtained, release all B tokens, increment the retry counter, and go to #5.

Assume a set S={S_i} of N nodes or machines. In addition, assume a function f: {0 . . . N−1}→S. Commonly, in distributed system, all nodes machines are aware of all other nodes or machines, so f can be just some order of the machines (e.g., by node ID). Each lease-granting node exposes three operations that other nodes can invoke when attempting to obtain leases: Acquire-Lease(lock-name), Renew-Lease(lock-name), and Free-Lease(lock-name). During execution, B tokens are renewed in the background, in order to prevent revocation of the tokens, which would result in a loss of the execution lock. In some examples, A tokens are also renewed. A server will not grant an A token if a B token is currently granted for the same node. The retry count has a maximum threshold.

When a node issues an Acquire-Lease request, the node ID, and the token type (A or B) is passed with the request. When a node fails to acquire a lease, the server from which it has attempted to obtain the lease from replies with the node ID that currently holds the lease. Using this information a node can determine whether another instance already holds majority of the leases. Each granted lease has a Time-To-Live (TTL) attached, at which point it is revoked. A renew-lease request resets the TTL. In the absence of a renew-lease request within the TTL, the lease will be revoked, permitting other nodes to acquire it, if they request it. This prevents a deadlock in situations where a node acquires a lease and then dies.

Figure 4:
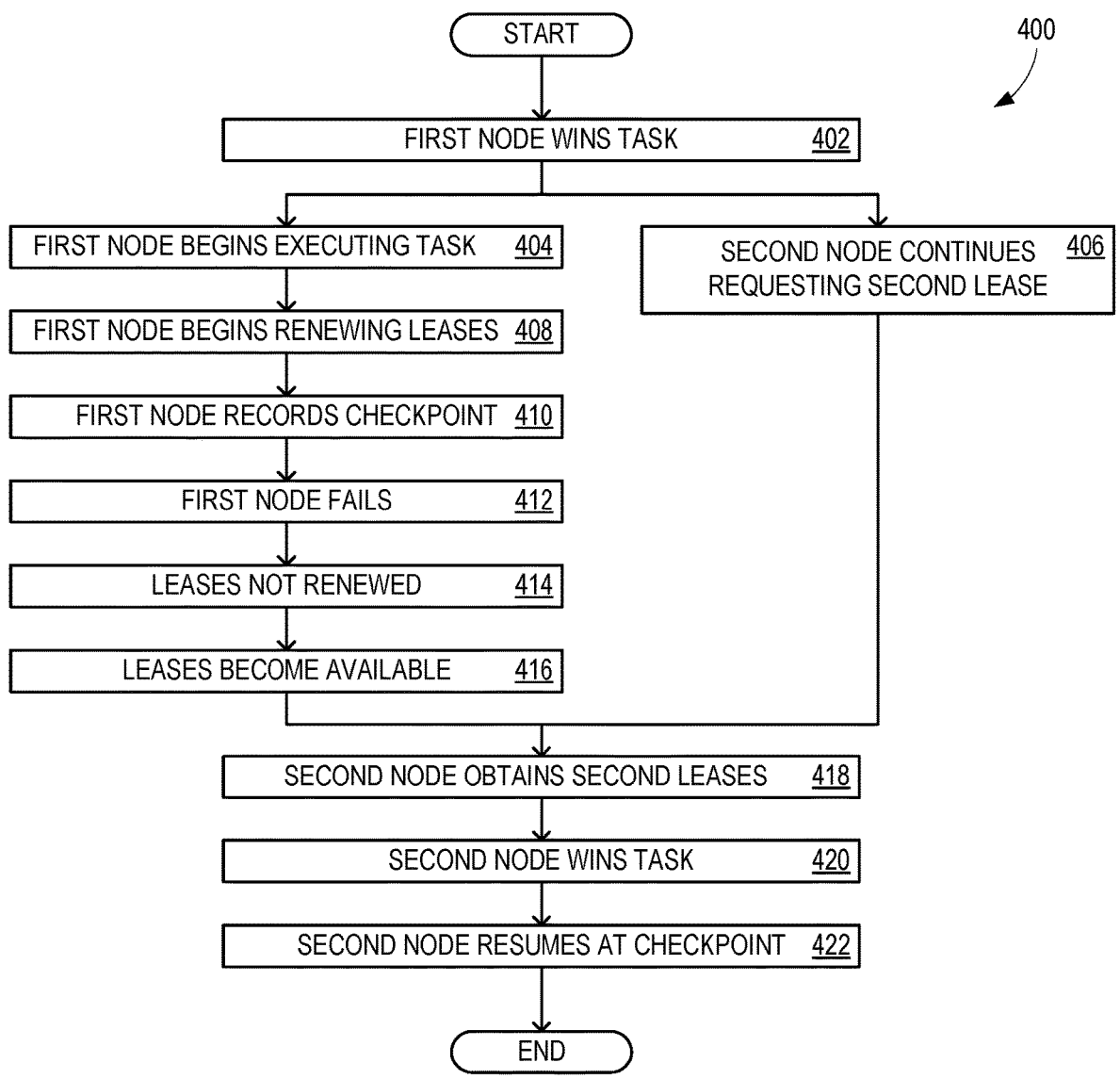
FIG. 4 is another flow chart illustrating exemplary operations involved in multi-phase distributed task coordination, such as may be performed by the arrangement of FIG. 1.

FIG. 4 is a flow chart 400 illustrating exemplary operations involved in multi-phase distributed task coordination, such as may be performed by arrangement 100 of FIG. 1. In some examples, operations described for flow chart 400 are performed by computing device 800 of FIG. 8. Flow chart 400 shows a scenario in which a first node begins executing a task, but fails prior to completion, so a second node takes over executing the task. Flow chart 400 commences with operation 402, which includes a first node winning a lock on a task by acquiring a majority of the second leases. Operation 404 includes, based at least on obtaining the majority of second leases, executing, by the first node, a task associated with the second leases.

In operation 406, a second node has determined that the first node had the majority of second leases for the task, but continues to try obtaining the execution lock for the task. Operation 406 includes, based at least on not obtaining the majority of second leases, releasing, by the second node, all second leases. Operation 406 further includes, based at least on not exceeding a retry threshold, requesting again, by the second node, a second lease from the second set of nodes. Operation 406 continues in parallel with operations 404-416.

The first node renews all second leases prior to a timeout, in operation 408, in order to prevent revocation of the second leases, which would result in loss of the execution lock. In some examples, the first node saves checkpoint data for intermediate results, in operation 410. In such examples, the checkpoint data can be leveraged to save time, by resume execution of the task at the intermediate stage, rather than requiring a complete restart from the beginning. In some examples, the checkpoint data is stored in task results 154 in tasking node 150 (of FIG. 1). However, at 412, the first node fails, and the renewal timeout expires at 414. At this point, the leases are revoked from the first node and become available again, in operation 416. Further details on this process are described in relation to FIG. 5. In some situation, the first node is still executing the task, but network issues prevent the renewal from reaching the lease granting nodes. In such a scenario, it is possible that another node will also execute the same task, if the first node continues its own execution after losing the leases.

Since the second node is still attempting to acquire the second leases, it is able to do so in operation 418. That is, operation 418 includes, based at least the first node failing to renew the at least one second lease prior to a timeout; obtaining, by the second node, at least one second lease from the second set of nodes. The second node then wins the execution lock for the task in operation 420. Operation 420 includes based at least on the second node obtaining at least one second lease, determining a majority holder of second leases. Operation 420 also includes, based at least on obtaining the majority of second leases, executing, by the second node, the task associated with the at least one second lease. In some examples, the second node retrieves checkpoint data and starts execution of the task at the checkpoint, in operation 422. In some examples, however, operation 422 is not performed, and the second node executes the task without leveraging any checkpoint data.

Figure 5:
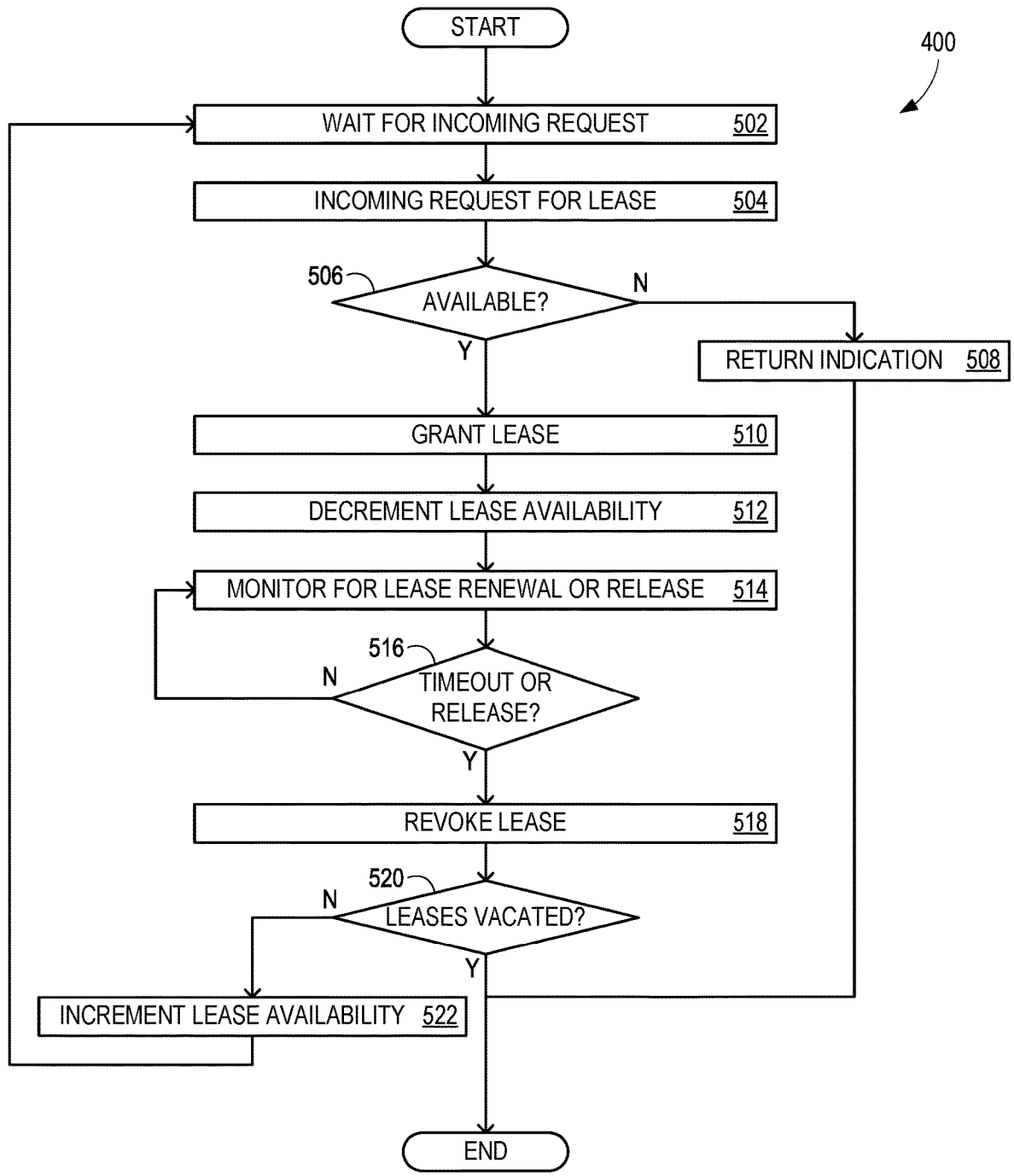
FIG. 5 is another flow chart illustrating exemplary operations involved in multi-phase distributed task coordination, such as may be performed by the arrangement of FIG. 1.

FIG. 5 is a flow chart 500 illustrating exemplary operations involved in multi-phase distributed task coordination, such as may be performed by arrangement 100 of FIG. 1. In some examples, operations described for flow chart 500 are performed by computing device 800 of FIG. 8. Flow chart 400 shows a process in which leases (either first leases or second leases) are granted, renewed, and revoked, from the perspective of the node that is granting and revoking the leases. Flow chart 500 commences with operation 502, in which the node waits for an incoming request for a lease. An incoming request arrives at 504. In some examples, the incoming request includes an NPU ID (e.g., NPU ID 112 of FIG. 1). Decision operation 506 determines whether a lease is available for grant to the requesting node. In some examples, only a single first or second lease grant is available from each granting node, and so decision operation 506 merely checks grant data 142 (of FIG. 1) to determine whether the requested first or second lease has been granted to a different node, and has not yet been revoked.

If a lease is not available, then a denial is returned in operation 508. In some examples, the denial of lease includes an indication of the node that currently has the lease. In such examples, any of the nodes requesting leases can thus track the number of leases held by other nodes. Tracking second lease denials that include an indication of the current lease holder permits, for example, one node to ascertain that another node has a majority of the second leases or that no node has a majority.

If, however, a lease is available, it is granted to the requesting node in operation 510. Operation 512 decrements the number of available leases, which in some examples, is decrementing from one to zero. In such examples, this may be implemented as a simple flag that the single lease has already been granted. First and second leases are handled independently, so that it is possible for a granting node to grant two leases, with one lease being a first lease and the other lease being a second lease. The node monitors for lease renewals in operation 514. Decision operation 516 is triggered by a timer event keyed to the lease timeout period (e.g., TTL) and/or an incoming message that the lease has been released. If the timeout condition has not occurred, and no release message has been received, flow chart 500 returns to operation 514 to monitor.

When the lease times out or is released, it is revoked in operation 518. In some situations, the timeout revocation or release occurs while the task is still yet to be completed (e.g., the winning node has not yet completed the task). In some situations, the granting node had been part of a set of granting nodes that is supplanted with a different set. In some situations, the release occurs because the task has been completed, and in some of those examples, when the task is completed, it is removed from the list of tasks to be performed. For scenarios in which the node is no longer part of the granting set, or the task is no longer pending, there is no further need to grant licenses to the task. The leases can then be vacated. Decision operation 520 determines whether the leases are vacated, because the node will no longer be handling requests for licenses. If so, flow chart 500 is complete. If not, the lease availability is incremented (e.g., from zero to one, which may be a binary flag, rather than a numeric value) in operation 522, and the node returns to waiting for requests in operation 502.

Figure 6:
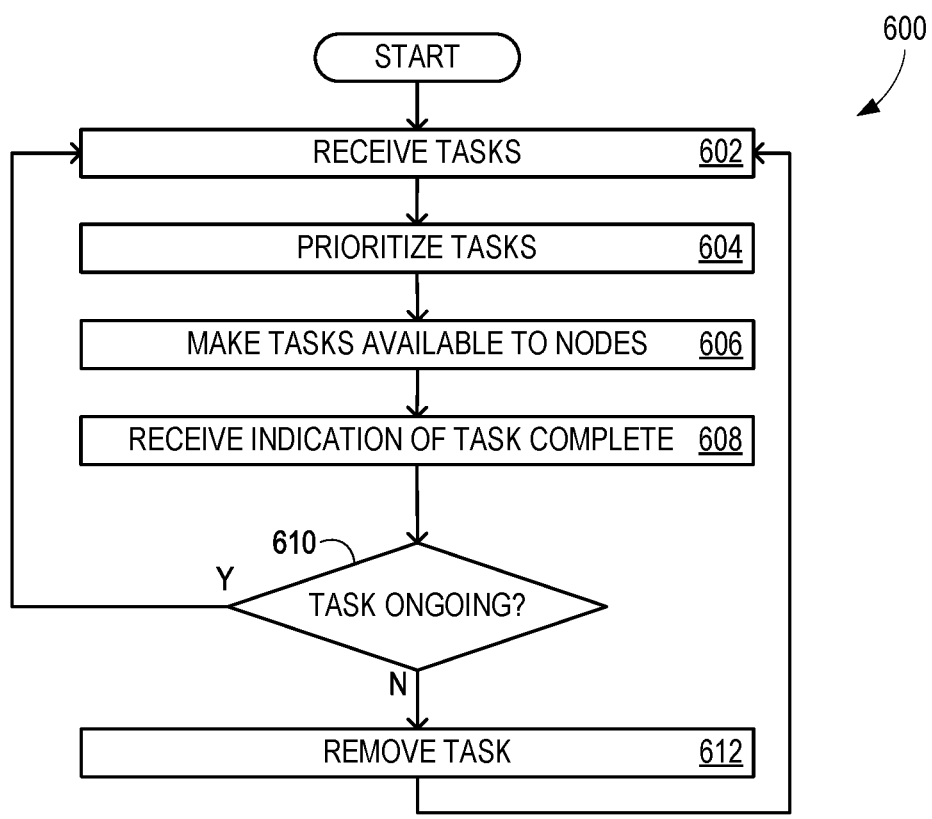
FIG. 6 is another flow chart illustrating exemplary operations involved in multi-phase distributed task coordination, such as may be performed by the arrangement of FIG. 1.

FIG. 6 is a flow chart 600 illustrating exemplary operations involved in multi-phase distributed task coordination, such as may be performed by arrangement 100 of FIG. 1. In some examples, operations described for flow chart 600 are performed by computing device 800 of FIG. 8. Flow chart 600 shows operations for some examples of tasking node 150 (of FIG. 1) for those examples that include a tasking node. Flow chart 600 commences with operation 602, in which tasks are received, for example from a user or another computational resources that generates tasks. The tasks are optionally prioritized in operation 604, for example placing tasks of greater urgency at the top of a task list.

The set of tasks is made available to the nodes (e.g., set of nodes 120 of FIG. 1), in operation 606. This permits the nodes to retrieve tasks and associated logic and data necessary to complete the tasks. The tasking node itself does not perform scheduling, and so does not assign tasks, but merely waits for indication of completion in operation 608. In some examples, the indication is only for completion; in some examples, checkpoint data (partial completion) is received in operation 608. In some examples where the task completion is not significant (e.g., the task is to be repeated no matter what the elapsed time has been since a prior completion), operation 608 is not used.

Decision operation 610 determines whether a task that has been identified as complete is to be removed from the task list, or is to remain on the task list because it is an ongoing, repetitive task. Tasks are removed in operation 612, and the new task list, which now does not include the removed task, is reprioritized by returning to operation 604 (after potentially receiving new tasks in operation 602). In some examples, an ongoing task becomes less urgent shortly after completion, and so the recent completion of the task is used to reprioritize the task list, when flow chart 600 returns to operation 604—also after potentially receiving new tasks in operation 602.

Figure 7:
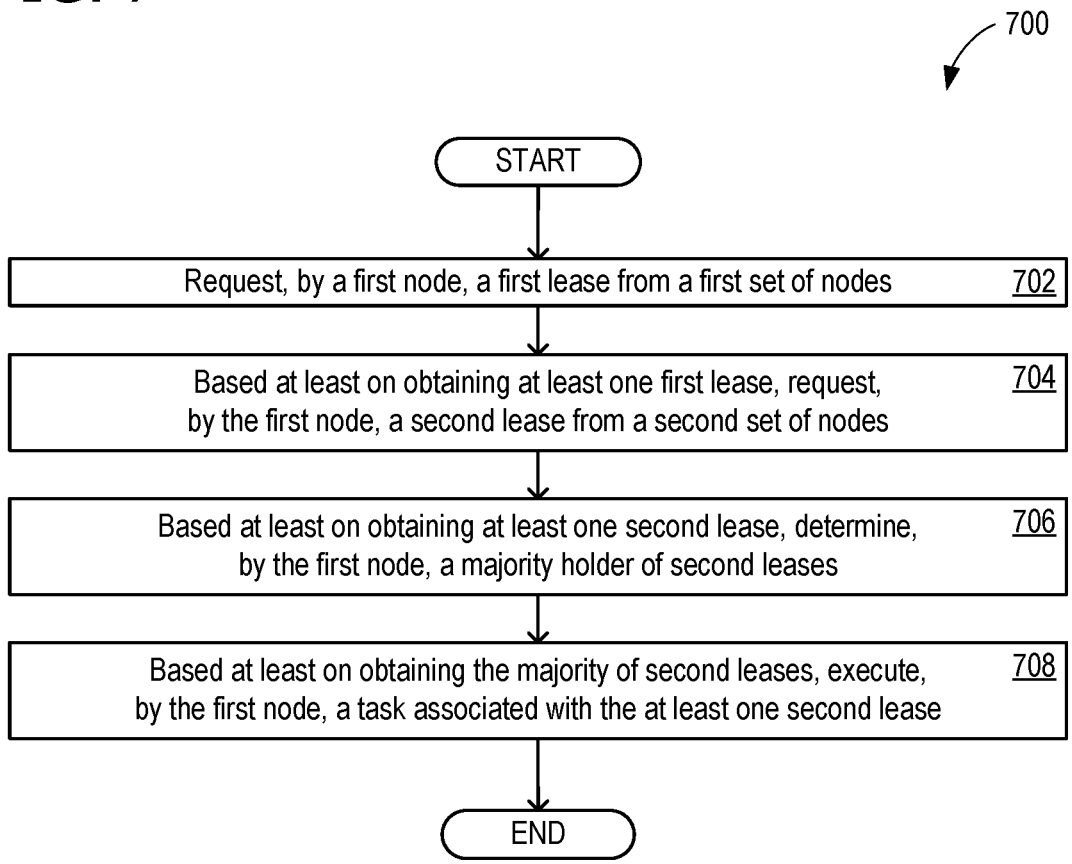
FIG. 7 is another flow chart illustrating exemplary operations involved in multi-phase distributed task coordination, such as may be performed by the arrangement of FIG. 1.

FIG. 7 is a flow chart 700 illustrating exemplary operations involved in multi-phase distributed task coordination, such as may be performed by arrangement 100 of FIG. 1. In some examples, operations described for flow chart 700 are performed by computing device 800 of FIG. 8. Flow chart 700 commences with operation 702, which includes requesting, by a first node, a first lease from a first set of nodes. In some examples, the first node comprises an instance on an NPU. In some examples, the first set of nodes comprises a set of instances on an NPU. Operation 704 includes, based at least on obtaining at least one first lease, requesting, by the first node, a second lease from a second set of nodes. In some examples, the second set of nodes has an odd number. Operation 706 includes, based at least on the first node obtaining at least one second lease, determining a majority holder of second leases. Operation 708 includes, based at least on obtaining the majority of second leases, executing, by the first node, a task associated with the at least one second lease.

Additional Examples

Some aspects and examples disclosed herein are directed to a system for multi-phase distributed task coordination comprising: a processor; and a computer-readable medium storing instructions that are operative upon execution by the processor to: request, by a first node, a first lease from a first set of nodes; based at least on obtaining at least one first lease, request, by the first node, a second lease from a second set of nodes; based at least on the first node obtaining at least one second lease, determine a majority holder of second leases; and based at least on obtaining the majority of second leases, execute, by the first node, a task associated with the at least one second lease.

Additional aspects and examples disclosed herein are directed to a method of multi-phase distributed task coordination comprising: requesting, by a first node, a first lease from a first set of nodes; based at least on obtaining at least one first lease, requesting, by the first node, a second lease from a second set of nodes; based at least on the first node obtaining at least one second lease, determining a majority holder of second leases; and based at least on obtaining the majority of second leases, executing, by the first node, a task associated with the at least one second lease.

Additional aspects and examples disclosed herein are directed to one or more computer storage devices having computer-executable instructions stored thereon for multi-phase distributed task coordination, which, on execution by a computer, cause the computer to perform operations comprising: determining a first set of nodes from which to request a first lease; requesting, by a first node, the first lease from the first set of nodes, wherein the first node comprises an instance on an NPU; after obtaining at least one first lease, delaying prior to requesting a second lease, wherein the delay has a duration that is based at least on a random or pseudorandom number; determining a second set of nodes from which to request the second lease, wherein the second set of nodes has an odd number; based at least on obtaining at least one first lease, requesting, by the first node, the second lease from the second set of nodes; based at least on the first node obtaining at least one second lease, determining a majority holder of second leases; based at least on not obtaining the majority of second leases: releasing, by the first node, all second leases; and based at least on not exceeding a retry threshold, requesting again, by the first node, a second lease from the second set of nodes; and based at least on obtaining the majority of second leases: executing, by the first node, a task associated with the at least one second lease; and renewing, by the first node, the at least one second lease prior to a timeout.

Alternatively, or in addition to the other examples described herein, examples include any combination of the following:

the first node comprises an instance on an NPU;
determining the first set of nodes from which to request the first lease;
determining the second set of nodes from which to request the second lease;
the second set of nodes has an odd number;
after obtaining the at least one first lease, delaying prior to requesting the second lease;
the delay has a duration that is based at least on a random or pseudorandom number;
based at least on not obtaining the majority of second leases, releasing, by the first node, all second leases;
based at least on not exceeding a retry threshold, requesting again, by the first node, a second lease from the second set of nodes;
renewing, by the first node, the at least one second lease prior to a timeout.
requesting, by a second node, a second lease from the second set of nodes;
based at least the first node failing to renew the at least one second lease prior to a timeout, obtaining, by the second node, at least one second lease from the second set of nodes;
based at least on the second node obtaining at least one second lease, determining a majority holder of second leases;
based at least on obtaining the majority of second leases, executing, by the second node, the task associated with the at least one second lease; and
receiving, from a tasking node, an indication of the task.

While the aspects of the disclosure have been described in terms of various examples with their associated operations, a person skilled in the art would appreciate that a combination of operations from any number of different examples is also within scope of the aspects of the disclosure.

Example Operating Environment

FIG. 8 is a block diagram of an example computing device 800 for implementing aspects disclosed herein, and is designated generally as computing device 800. Computing device 800 is an example of a suitable computing environment and is not intended to suggest any limitation as to the scope of use or functionality of the examples disclosed herein. Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer-storage memory 812, one or more processors 814, one or more presentation components 816, I/O ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more busses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer-storage media references below and operatively provide storage of computer-readable instructions, data structures, program modules and other data for computing device 800. In some examples, memory 812 stores one or more of an operating system, a universal application platform, or other program modules and program data. Memory 812 is thus able to store and access data 812a and instructions 812b that are executable by processor 814 and configured to carry out the various operations disclosed herein.

In some examples, memory 812 includes computer-storage media in the form of volatile and/or nonvolatile memory, removable or non-removable memory, data disks in virtual environments, or a combination thereof. Memory 812 may include any quantity of memory associated with or accessible by computing device 800. Memory 812 may be internal to computing device 800 (as shown in FIG. 8), external to computing device 800 (not shown), or both (not shown). Examples of memory 812 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 800. Additionally, or alternatively, memory 812 may be distributed across multiple computing devices 800, for example, in a virtualized environment in which instruction processing is carried out on multiple computing devices 800. For the purposes of this disclosure, "computer storage media," "computer-storage memory," "memory," and "memory devices" are synonymous terms for computer-storage memory 812, and none of these terms include carrier waves or propagating signaling.

Processor(s) 814 may include any quantity of processing units that read data from various entities, such as memory 812 or I/O components 820, and may include CPUs and/or GPUs. Specifically, processor(s) 814 are programmed to execute computer-executable instructions for implementing aspects of the disclosure. The instructions may be performed by the processor, by multiple processors within computing device 800, or by a processor external to client computing device 800. In some examples, processor(s) 814 are programmed to execute instructions such as those illustrated in the flow charts discussed below and depicted in the accompanying drawings. Moreover, in some examples, processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via network component 824 using logical connections to one or more remote computers. In some examples, network component 824 includes a network interface card and/or computer-executable instructions (e.g., a driver) for operating the network interface card. Communication between computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826a to a cloud resource 828 across network 830. Various different examples of communication links 826 and 826a include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for multi-phase distributed task coordination, the system comprising:
    a processor; and
    a computer-readable medium storing instructions that are operative upon execution by the processor to:
        request, by a set of candidate nodes, the set of candidate nodes comprising a first node, a first lease from a first set of nodes;
        based at least on the first node obtaining at least one first lease, request, by a subset of the set of candidate nodes, the subset comprising the candidate nodes that have obtained at least one first lease, a second lease from a second set of nodes;
        based at least on the first node obtaining at least one second lease, determine a majority holder of second leases, wherein each candidate node of the subset tracks a number of the second leases held by all the other candidate nodes of the subset; and
        based at least on determining that the first node is the majority holder of second leases, execute, by the first node, a task associated with the at least one second lease.

2. The system of claim 1, wherein the first node comprises an instance on an online processing unit (NPU).

3. The system of claim 1, wherein the instructions are further operative to:
    determine the first set of nodes from which to request the first lease; and
    determine the second set of nodes from which to request the second lease, wherein the second set of nodes has an odd number.

4. The system of claim 1, wherein the instructions are further operative to:
    after obtaining the at least one first lease, delay prior to requesting the second lease, wherein the delay has a duration that is based at least on a node identification (ID) number or retry number.

5. The system of claim 1, wherein the instructions are further operative to:
    based at least on not obtaining the majority of second leases, release, by the first node, all second leases; and
    based at least on not exceeding a retry threshold, request again, by the first node, a second lease from the second set of nodes.

6. The system of claim 1, wherein the instructions are further operative to:
    renew, by the first node, the at least one second lease prior to a timeout.

7. The system of claim 1, wherein the instructions are further operative to:
    request, by a second node, a second lease from the second set of nodes; and
    based at least the first node failing to renew the at least one second lease prior to a timeout, obtain, by the second node, at least one second lease from the second set of nodes;
    based at least on the second node obtaining at least one second lease, determine the majority holder of second leases; and
    based at least on obtaining the majority of second leases, execute, by the second node, the task associated with the at least one second lease.

8. A method of multi-phase distributed task coordination, the method comprising:
    requesting, by a set of candidate nodes, the set of candidate nodes comprising a first node, a first lease from a first set of nodes;
    based at least on the first node obtaining at least one first lease, requesting, by a subset of the set of candidate nodes, the subset comprising the candidate nodes that have obtained at least one first lease, a second lease from a second set of nodes;

based at least on the first node obtaining at least one second lease, determining a majority holder of second leases, wherein each candidate node of the subset tracks a number of the second leases held by all the other candidate nodes of the subset; and based at least on determining that the first node is the majority holder of second leases, executing, by the first node, a task associated with the at least one second lease.

9. The method of claim 8, wherein the first node comprises an instance on an online processing unit (NPU).

10. The method of claim 8, further comprising:
determining the first set of nodes from which to request the first lease.

11. The method of claim 8, further comprising:
determining the second set of nodes from which to request the second lease.

12. The method of claim 11, wherein the second set of nodes has an odd number.

13. The method of claim 8, further comprising:
after obtaining the at least one first lease, delaying prior to requesting the second lease, wherein the delay has a duration that is based at least on a node identification (ID) number or retry number.

14. The method of claim 8, further comprising:
based at least on not obtaining the majority of second leases, releasing, by the first node, all second leases.

15. The method of claim 14, further comprising:
based at least on not exceeding a retry threshold, requesting again, by the first node, a second lease from the second set of nodes.

16. The method of claim 8, further comprising:
renewing, by the first node, the at least one second lease prior to a timeout.

17. The method of claim 8, further comprising:
requesting, by a second node, a second lease from the second set of nodes; and based at least the first node failing to renew the at least one second lease prior to a timeout, obtaining, by the second node, at least one second lease from the second set of nodes;

based at least on the second node obtaining at least one second lease, determining the majority holder of second leases; and based at least on obtaining the majority of second leases, executing, by the second node, the task associated with the at least one second lease.

18. The method of claim 8, further comprising:
receiving, from a tasking node, an indication of the task.

19. One or more computer storage devices having computer-executable instructions stored thereon for multi-phase distributed task coordination, which, on execution by a computer, cause the computer to perform operations comprising:

determining a first set of nodes from which to request a first lease;

requesting, by a set of candidate nodes, the set of candidate nodes comprising a first node, the first lease from the first set of nodes, wherein the first node comprises a instance on an online processing unit (NPU);

after obtaining at least one first lease, delaying prior to requesting a second lease, wherein the delay has a duration that is based at least on a random or pseudo-random number;

determining a second set of nodes from which to request the second lease, wherein the second set of nodes has an odd number;

based at least on the first node obtaining at least one first lease, requesting, by a subset of the set of candidate nodes, the subset comprising the candidate nodes that have obtained at least one first lease, the second lease from the second set of nodes;

based at least on the first node obtaining at least one second lease, determining a majority holder of second leases, wherein each candidate node of the subset tracks a number of the second leases held by all the other candidate nodes of the subset;

based at least on not obtaining a majority of second leases:
releasing, by the first node, all second leases; and
based at least on not exceeding a retry threshold, requesting again, by the first node, a second lease from the second set of nodes; and based at least on determining that the first node is the majority holder of second leases:
executing, by the first node, a task associated with the at least one second lease; and
renewing, by the first node, the at least one second lease prior to a timeout.

20. The one or more computer storage devices of claim 19, wherein the operations further comprise:

requesting, by a second node, a second lease from the second set of nodes;

based at least the first node failing to renew the at least one second lease prior to a timeout, obtaining, by the second node, at least one second lease from the second set of nodes;

based at least on the second node obtaining at least one second lease, determining the majority holder of second leases; and based at least on obtaining the majority of second leases, executing, by the second node, the task associated with the at least one second lease.

* * * * *